United States Patent [19]

Lee

[11] Patent Number: 4,845,312

[45] Date of Patent: Jul. 4, 1989

[54] ELECTRICAL OUTLET BOX AND OUTLET THEREFOR

[76] Inventor: Hop Lee, 2455-24th Ave., San Francisco, Calif. 94116

[21] Appl. No.: 167,992

[22] Filed: Mar. 14, 1988

[51] Int. Cl.⁴ .............................................. H02G 3/06
[52] U.S. Cl. .................... 174/65 R; 174/53; 439/539
[58] Field of Search .......... 174/65 R, 66, 53; 285/158; 220/3.2; 439/538, 539

[56] References Cited

U.S. PATENT DOCUMENTS

| | | | |
|---|---|---|---|
| 2,740,873 | 4/1956 | Cronk | 174/66 X |
| 2,927,807 | 3/1960 | Campbell | 285/158 X |
| 4,211,464 | 7/1980 | Lee | 174/53 X |
| 4,249,789 | 2/1981 | Lee | 439/536 X |
| 4,293,178 | 10/1981 | Lee | 174/65 R X |
| 4,324,424 | 4/1982 | Woodliff et al. | 174/65 R X |

Primary Examiner—Arthur T. Grimley
Assistant Examiner—David A. Tone
Attorney, Agent, or Firm—Linval B. Castle

[57] ABSTRACT

An electrical outlet box with attached threaded coupling having a bore entering the box, the bore accomodating either thin wall conduit or cable. A removable gate in an interior wall slot in the box covers the coupling bore and a hole in the gate, smaller than the diameter of the bore, acts as a stop to prevent intrusion of conduit which is secured by a nut threaded on the coupling. When the gate is removed, a cable connector with hex end that snugly fits into the gate slot and is also secured by a threaded nut. Outlets for the box have U-shaped yokes at each end which are pressed into shallow grooves in each interior end wall to secure the outlet in the box, and the box covers have blocks near the sides of the inside surface for engaging the box interior side walls to prevent flexing and breakage.

5 Claims, 3 Drawing Sheets

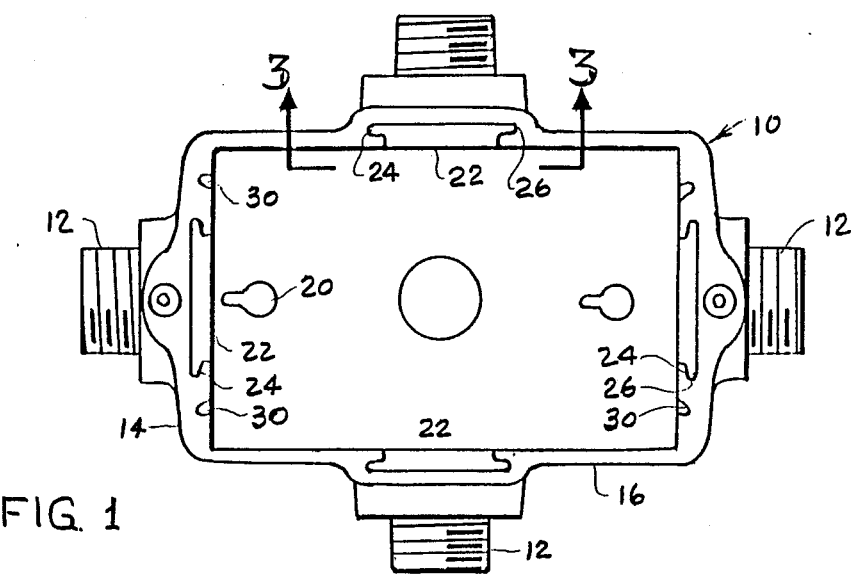
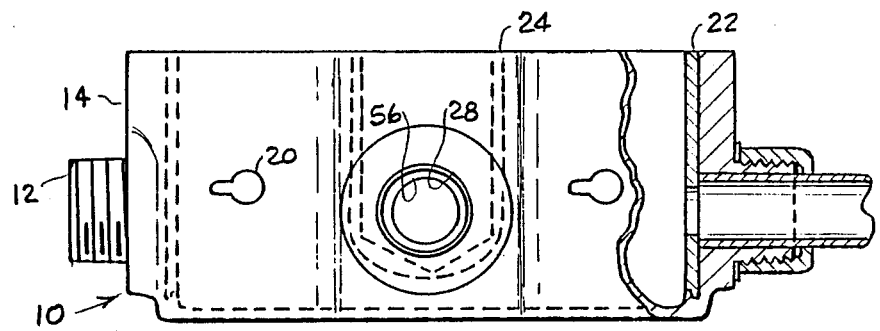
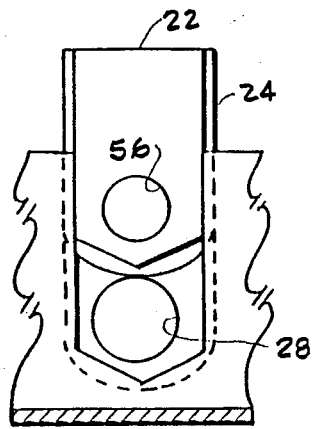
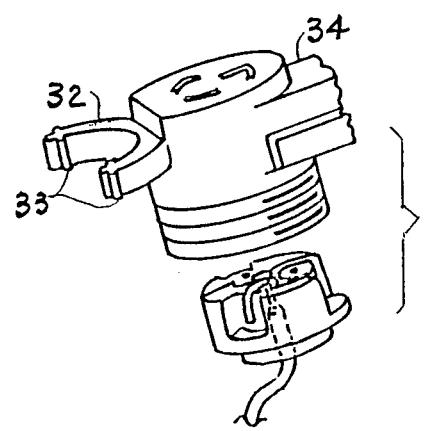

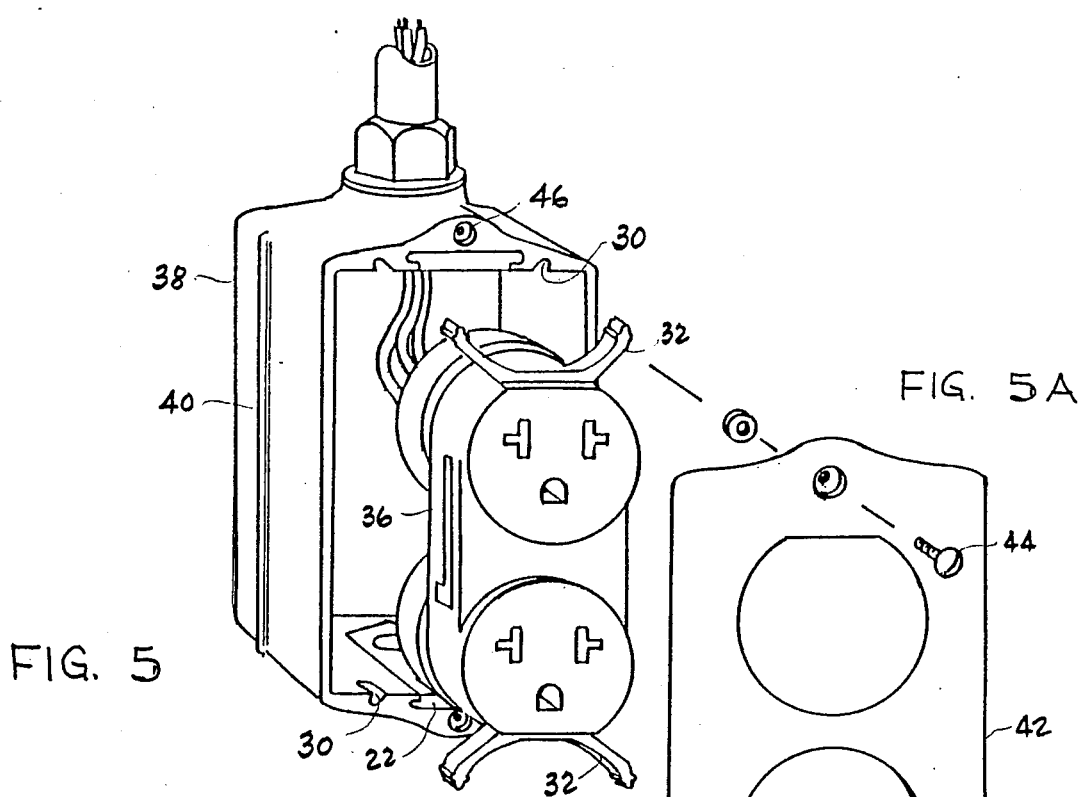
FIG. 5
FIG. 5A
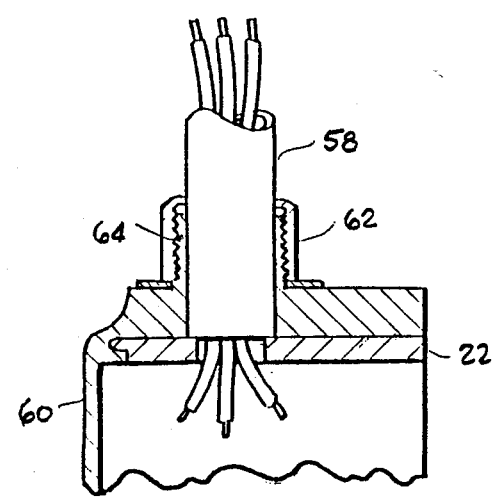
FIG. 7
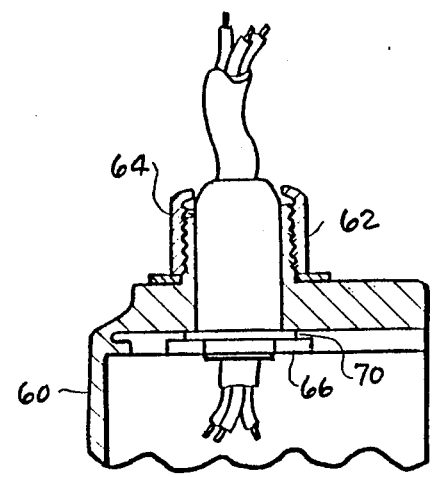
FIG. 8

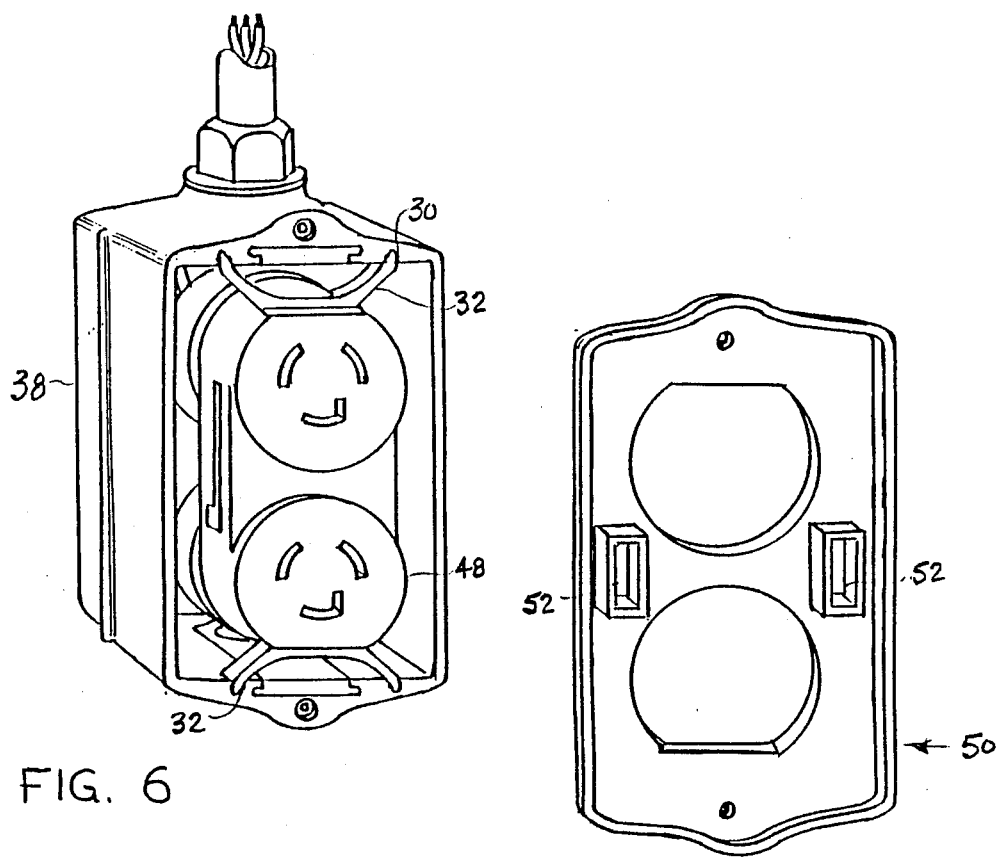
FIG. 6
FIG. 6A
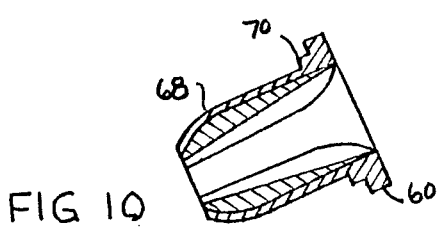
FIG 10
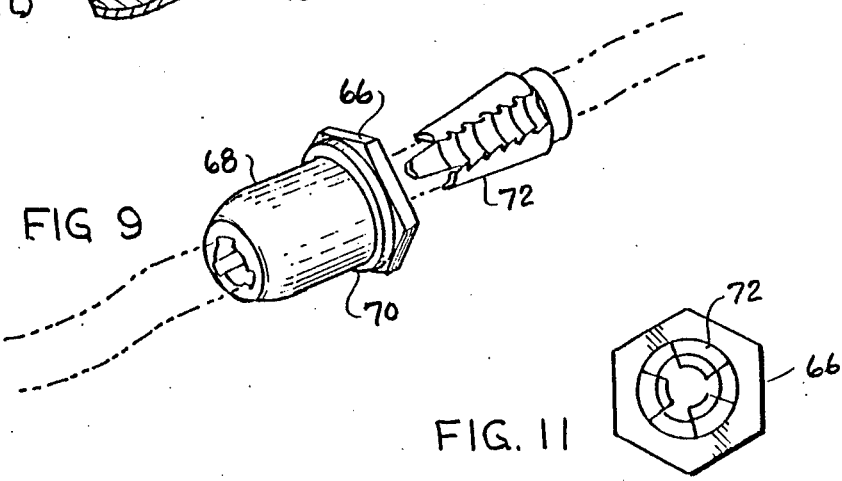
FIG 9
FIG. 11

ELECTRICAL OUTLET BOX AND OUTLET THEREFOR

BRIEF SUMMARY OF THE INVENTION

This invention relates to electrical apparatus and in particular to a novel outlet box and outlet therefor.

The present invention includes the advantages disclosed in several of my earlier patents and, in addition, discloses a novel outlet box which is constructed to receive and secure either solid metal conduit or multiconductor cables. The duplex outlet includes the safety features disclosed in my U.S. Pat. No. 4,211,464 and further includes a novel means for mounting the outlet in the outlet box to be described.

DESCRIPTION OF THE DRAWINGS

In the drawings which illustrate the preferred embodiment of the invention:

FIG. 1 is a plan view of the electrical outlet box with cover removed;

FIG. 2 is a side elevational view thereof with a portion shown as a sectional view;

FIG. 3 is a view taken along the lines 3—3 of FIG. 1;

FIG. 4 illustrates a portion of an electrical outlet adapted to be mounted in the outlet box of FIG. 1;

FIG. 5 is a perspective view illustrating a duplex outlet positioned for installation in an outlet box;

FIG. 5A illustrates the exterior of the outlet box cover;

FIG. 6 is a perspective view illustrating a duplex outlet mounted in an outlet box;

FIG. 6A illustrates the interior of the outlet box cover;

FIG. 7 is a sectional view of a portion of the outlet box and illustrates the mechanism for securing a thin wall metal conduit to the box;

FIG. 8 is a sectional view of a portion of the box illustrating the securing of a cable connector to the box;

FIG. 9 is a perspective view of the cable connector of FIG. 8;

FIG. 10 is a sectional view of the cable connector of FIG. 9; and

FIG. 11 is an end view of the cable connector.

DETAILED DESCRIPTION

As illustrated in FIGS. 1 and 2, the outlet box 10 of the invention is of conventional size, is preferably formed of a plastic compound, and is provided with one of more threaded male connector couplings 12. In the illustrations, such connector couplings 12 are shown at each end 14 and on each side wall 16 of the box. The rear box wall 18 and side walls 1 also contain box mounting holes 20.

The end walls 14 and side walls 16 of the outlet box are formed of thicker material around the couplings 12 to provide strength for the couplings and also to provide space for removable gates 22 having longitudinal edge tongues 24 that may be inserted into a grooved slot 26 in the interior of the walls and centered over the bore 28 of the couplings, as shown by dashed lines in FIG. 2 and in detail in FIG. 3. The purpose and use of the gate 22 will be subsequently discussed in greater detail in connection with FIGS. 7–11.

It will be noticed that the box of FIG. 1 also has two shallow grooves 30 formed in each end wall 14. The grooves 30 receive the ends of a U-shaped mounting yoke 32 formed in the end of the electrical outlet socket 34 as shown in FIG. 4. To assure a tight fit in the grooves, the ends of the yokes may have small width expansions 33, as shown.

The electrical duplex outlet socket 34 is preferably the type described in my U.S. Pat. Nos. 4,211,464 and 4,249,789. This outlet socket includes securing means for clamping the bare wire strands of wires into contact with the socket electrodes in such a way that the socket may be safely handled without danger of short circuiting the wires or of shocking the handler.

FIG. 5 illustrates a duplex socket 36 positioned for installation in an outlet box 38 having threaded connector couplings only in the end walls. To stiffen the side walls of this box 38 during handling, a thin longitudinal rib 40 may be formed on each exterior surface. The box 38 of FIG. 5 is illustrated with the cover 42 illustrated in FIG. 5A. The cover is attached to the box by screws 44 that are threaded into tapped holes 46 in the box and functions to secure the duplex socket in the box.

FIG. 6 illustrates a "twist-lock" type of duplex socket 48 mounted in the box 38 by inserting the ends of the yoke 32 into the slots 30 in the box. The slots are shallow so that the yoke cannot be depressed beyond the point at which its exterior surface is flush with the box surface, as shown in FIG. 6, and the yoke and duplex socket is secured in the box by and box cover 50 of FIG. 6A.

FIG. 6A illustrates the interior surface of the cover 50 which preferably has formed thereto a pair of blocks 52 which fill the space and contacts the sides of an electrical outlet socket and the interior walls of the outlet box. The blocks 52 are preferably hollowed or boxlike, as shown, and have a side surface that is parallel with the outlet box wall. The blocks function as a wall stiffener for preventing accidental collapse of the wall after installation of the box cover.

As shown in FIG. 3, the gate 22 contains a hole 56 smaller is diameter than the bore 28 of the threaded box couplings 12. When a gate is completely inserted in the box wall slot, the hole 56 is coaxial with the bore 28 as shown in FIG. 2.

As shown in FIG. 7, a gate 22 inserted in the wall slot of a box 60 functions as a stop that limits the entrance of a thin wall metal conduit 58, The threaded couplings are tapered and are sufficiently flexible so that the tightening of a threaded coupling compresses against a conduit so that the conduit 58 of FIG. 7 is secured against removal by a compression nut 62 which, when tightened on the threaded coupling 64 clamps the coupling against the conduit. Similar arrangements are described in my abandoned U.S. application Ser. No. 369470, filed April 19, 1982, and in my British Pat. No. 2,121,134B, granted 23 October 1985.

FIGS. 8–11 illustrate the connection of a cable to the outlet box. In FIG. 8, the gate 22 of FIG. 7 has been removed so that only the larger conduit bore may be seen through the box wall. A cable connector that is very similar to that described in my U.S. Pat. No. 4,293,178 is modified by providing one end with a hexagonal, square, or octagonal nut, the requirement being that the nut have a pair of parallel sides that will tightly press into the groove previously occupied by the gate 22 to thus prevent the possibility of rotation of the connector.

FIGS. 9 and 11 illustrate the cable connector 64 with a hexagonal end nut 66. Separating the nut 66 from a tubular retaining collar 68 is a ring washer 70 that forces the end surface of the nut 66 into a flush relationship with the interior surface of the box 60. As described in my aforementioned U.S. Pat. No. 4,293,178, the collar 68 has a tapered interior as shown in FIG. 10, and within the collar are at least three tapered fingers 72 loosely coupled to a ring 72 so that the fingers 72 may be moved together within the collar 68. The inner surfaces of the fingers 72 are formed with arcuate teeth so that they form a cable grip that bites into the outer insulation surface when the fingers are compressed together within the tapered collar. This compressing is accomplished by forcibly urging the cable grip, with cable, into the tapered collar and securing the collar in the slitted box coupling 64 with the nut 62. Once inserted, the cable cannot be further inserted into the box or easily withdrawn from the connector.

What is claimed is:

1. An electrical outlet box having a floor, side walls and an open front face, said box including:
   a threaded tapered compressible male connector coupling extending from at least one wall, said coupling having a bore extending into the interior of said box;
   a slot formed in the interior surface of a least one wall, said slot having parallel edges perpendicular to the front face of said box and extending from said front face over the bore of said coupling to a point near the floor of said box;
   a removable cable connector positionable within the bore of said coupling, said connector having a first end with parallel sides engagable between the parallel edges of said slot in said box wall, said cable connector being secured against removal within said coupling by a nut threaded to said tapered compressible connector coupling; and
   a removable gate slideable into said slot in the absence of said cable coupling, said gate having a hole positioned to be concentric with said coupling bore and having a diameter smaller than the bore of said coupling bore, said gate providing a stop against the intrusion of a solid conduit into the interior of said box through the bore of said connector coupling.

2. The outlet box claimed in claim 1 wherein a solid conduit in the bore of said connector is secured by said nut threaded on the said connector.

3. The outlet box claimed in claim 1 further including a box cover having inside and outside surfaces, the inside surface of said cover having raised box wall reinforcing members, said members having a surface spaced from side edges of said cover so that, when said cover is installed over the open front face of a box, said member will contact the inside side wall of said box for preventing inward flexing of said wall.

4. The outlet box claimed in claim 3 wherein said box cover is secured to said box by a pair screws engaging threaded holes into the end walls of said outlet box.

5. The outlet box claimed in claim 1 further including a pair of spaced grooves in each interior end wall of said box and intersecting the front face thereof, and wherein an electrical outlet receptacle to be installed in said box includes a generally U-shaped yoke formed at each end, said outlet receptacle being secured in said outlet box by pressing the ends of each U-shaped yoke into each pair of spaced end wall grooves.

* * * * *